United States Patent [19]

Fearing, Jr. et al.

[11] Patent Number: 5,381,321
[45] Date of Patent: Jan. 10, 1995

[54] LUMINAIRE FOR HAZARDOUS ATMOSPHERES AND EXPLOSION PROOF ENCLOSURE FOR POWER SUPPLY THEREFOR

[75] Inventors: Oliver H. Fearing, Jr., Huntington; Peter J. Green, Barboursville; Richard E. Kirby, Ona, all of W. Va.

[73] Assignee: Service Machine Co., Huntington, W. Va.

[21] Appl. No.: 892,558

[22] Filed: Jun. 2, 1992

[51] Int. Cl.$^6$ ................................................. F21S 3/02
[52] U.S. Cl. ............................ 362/217; 362/221; 362/223; 362/297; 439/242
[58] Field of Search ............... 362/217, 221, 223, 225, 362/226, 260, 269, 346, 370, 277, 297, 282, 285, 298; 439/226, 242, 243, 244

[56] References Cited

U.S. PATENT DOCUMENTS

| | | | |
|---|---|---|---|
| 2,760,053 | 8/1956 | Choisser | 362/223 |
| 3,249,749 | 5/1966 | Haas | 362/221 |
| 3,805,053 | 4/1974 | Julinot | 362/223 |
| 4,092,706 | 5/1978 | Vest | 362/223 |
| 4,644,453 | 2/1987 | Vest | 362/374 |
| 4,674,016 | 6/1987 | Gallagher | 362/217 |
| 4,803,600 | 2/1989 | Pepping | 362/217 |
| 5,088,015 | 2/1992 | Baggio et al. | 362/217 |

FOREIGN PATENT DOCUMENTS

| | | | |
|---|---|---|---|
| 0697829 | 11/1964 | Canada | 362/217 |
| 0042362 | 12/1981 | European Pat. Off. | 362/260 |
| 2394013 | 2/1979 | France | 362/217 |
| 1130072 | 5/1962 | Germany | 362/217 |

*Primary Examiner*—Ira S. Lazarus
*Assistant Examiner*—Y. Quach
*Attorney, Agent, or Firm*—McCaleb, Lucas & Brugman

[57] ABSTRACT

A luminaire comprises a transparent enclosure tube, a cylindrical handle housing at one end of the tube, and a cylindrical cap housing at the opposite end of the tube. A light carriage within the tube comprises a unitary subassembly consisting of a rigid reflector having light bulb holders at opposite ends and a fluorescent bulb secured between the holders. The light carriage is removeable and replaceable as a unit without tools through an open end of the tube by unplugging it from and plugging it into a contact receptacle in the handle housing. Complementary plug and socket formations in the handle housing and light carriage assure alignment of bulb contacts. The housings have castellated ends engageable with detents on mounting brackets on a base to hold the luminaire and to direct light in a selected direction. The cap housing has a telescopical end section which is manually moveable against a spring to release the luminaire from the base without tools. An explosion proof enclosure for a lighting system which powers the luminaire has multiple identical explosion proof inlet and outlet openings which handle both high voltage AC circuits and low voltage DC intrinsically safe circuits. Each enclosure has thick flat metal plate end walls and a plurality of identical circular openings located side by side in the wall. Each opening has an internal surface configuration defining one side of a flame-quenching path. For AC power connections, explosion proof receptacles are fitted in some of the openings each receptacle having external surface configurations which define the other side of the flame-quenching path. For intrinsically safe circuit conductors, other openings are fitted with adaptors having identical external surface configurations defining flame-quenching paths, and the adaptors have a variety of electrical and mechanical mechanisms controlling access to the enclosure; three examples of such mechanisms are given as a solid plug, intrinsically safe receptacles, and a switch actuating plunger.

16 Claims, 14 Drawing Sheets

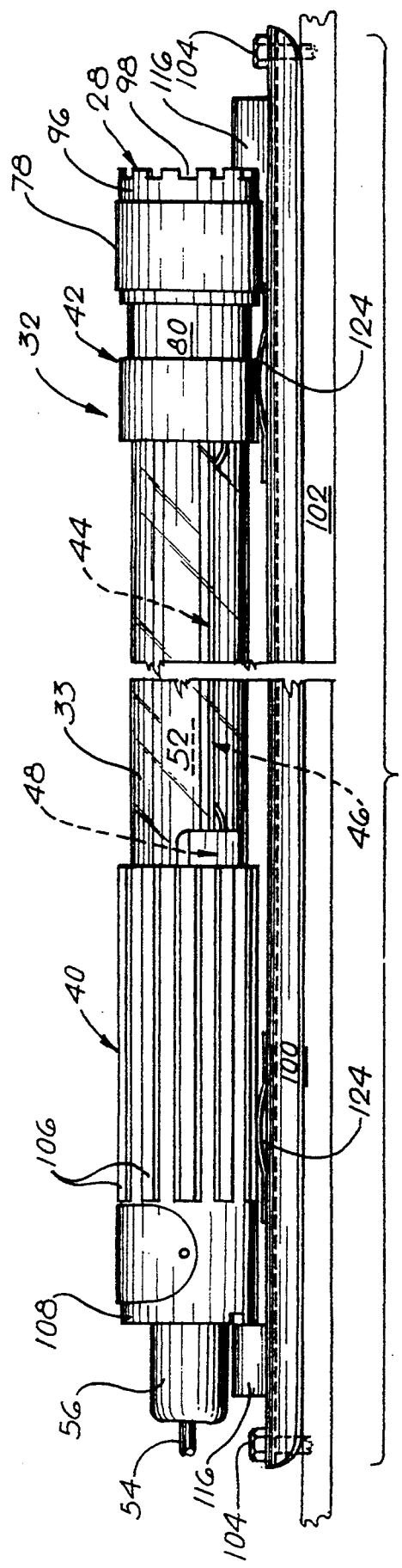
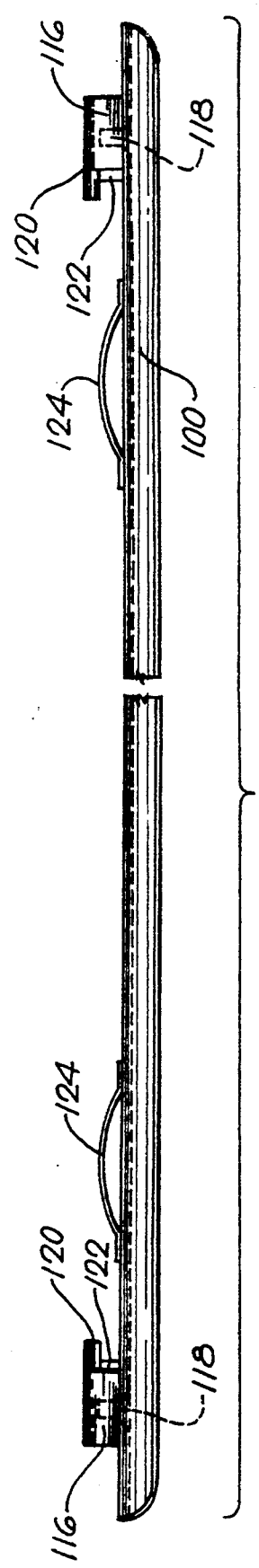
FIG. 2
FIG. 3

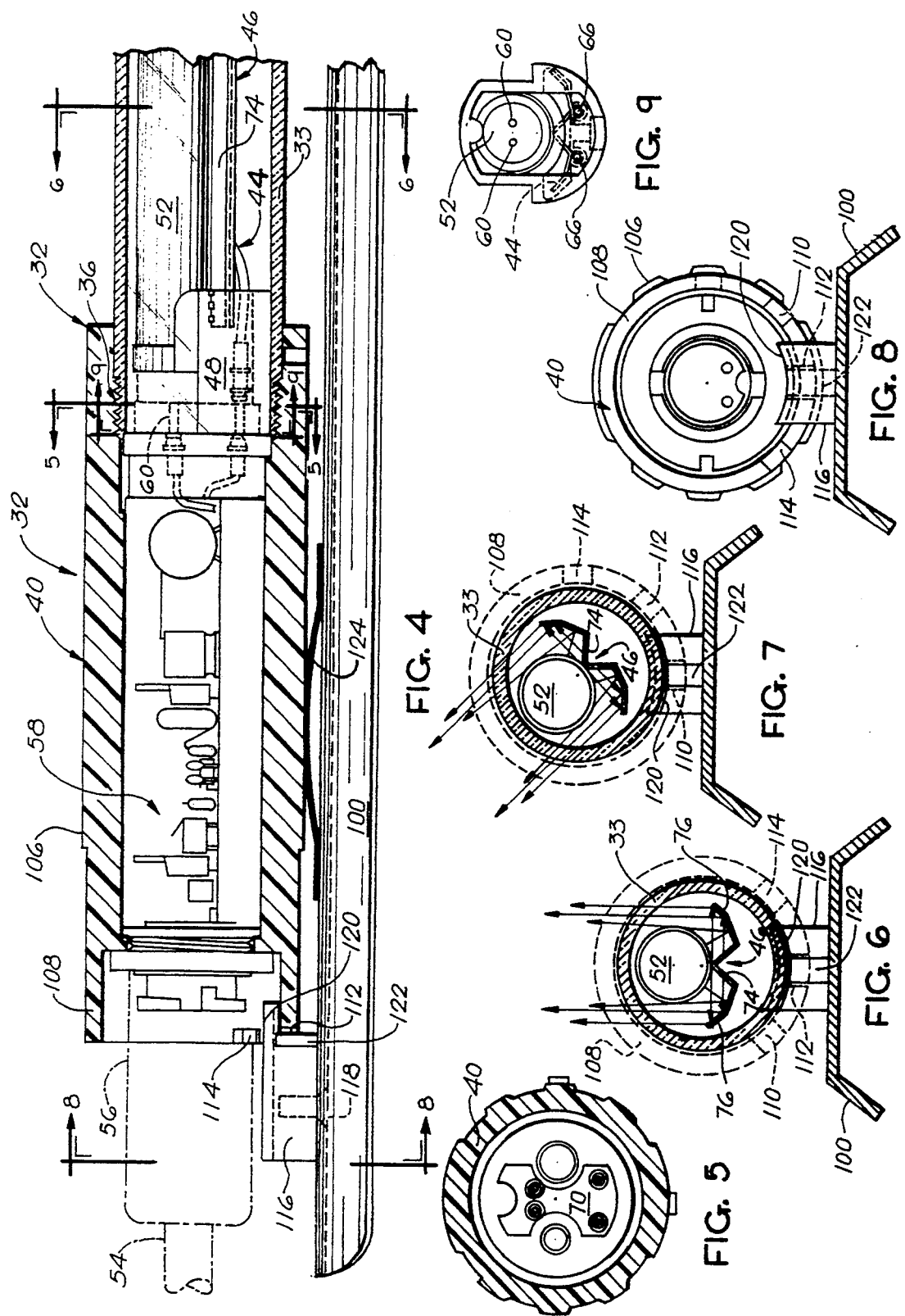

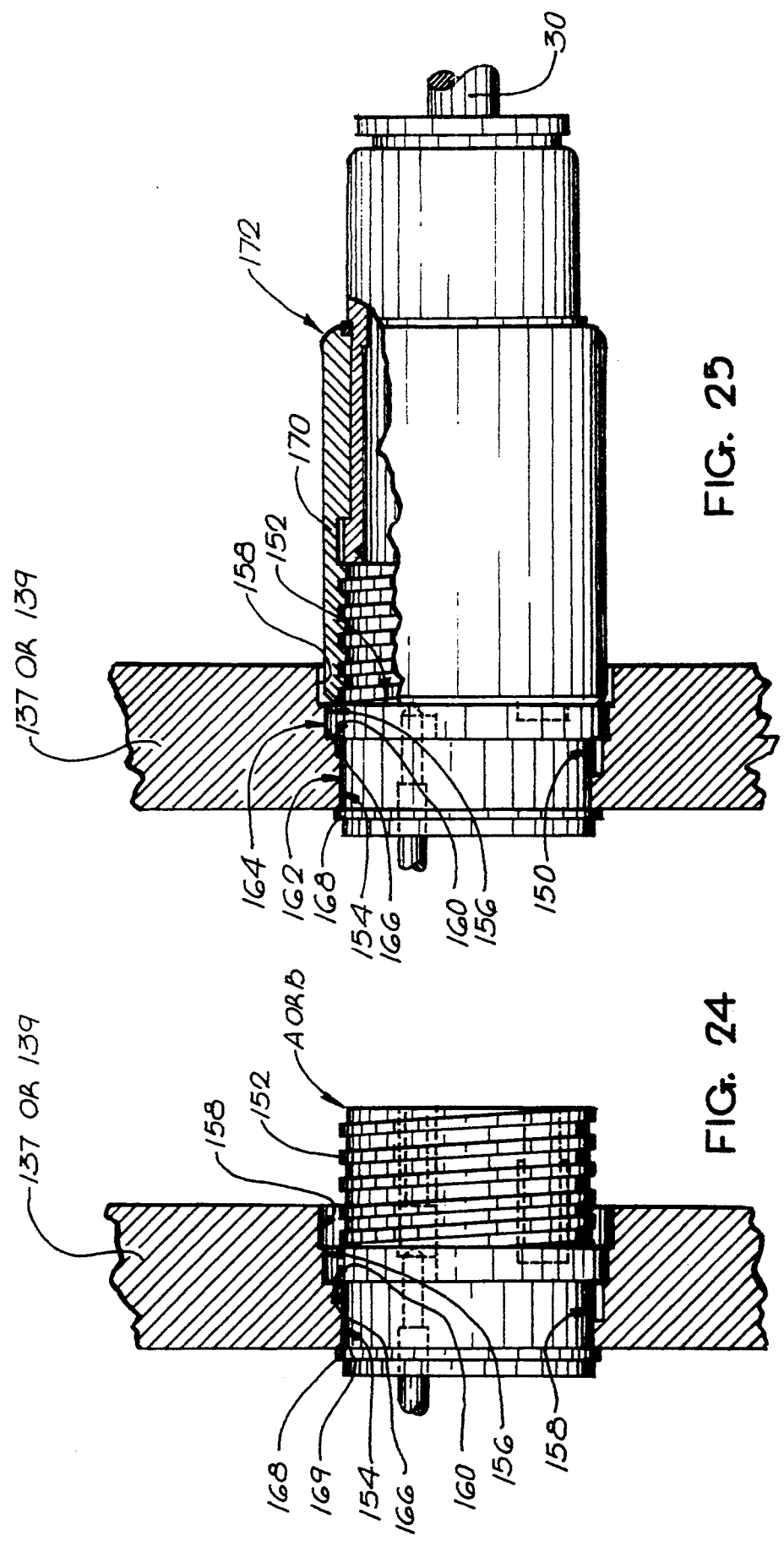

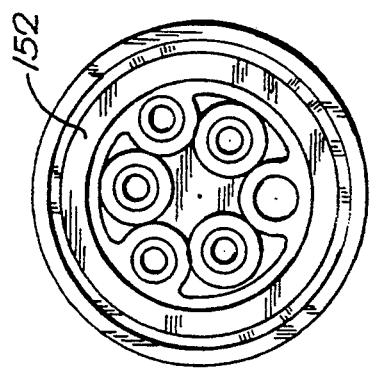
FIG. 27
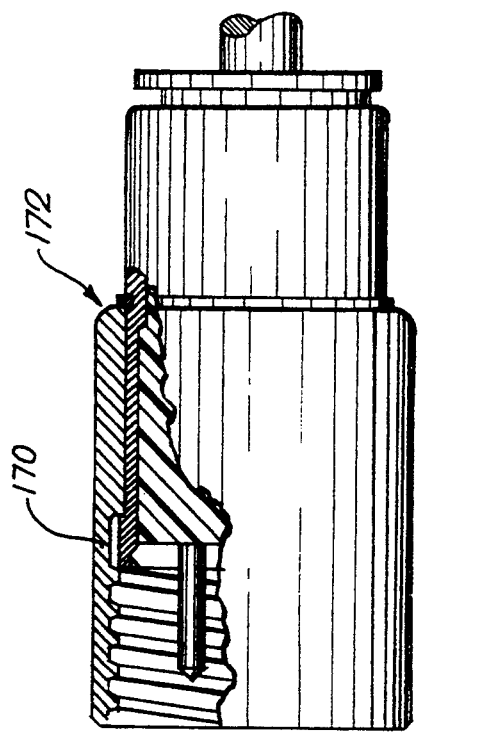
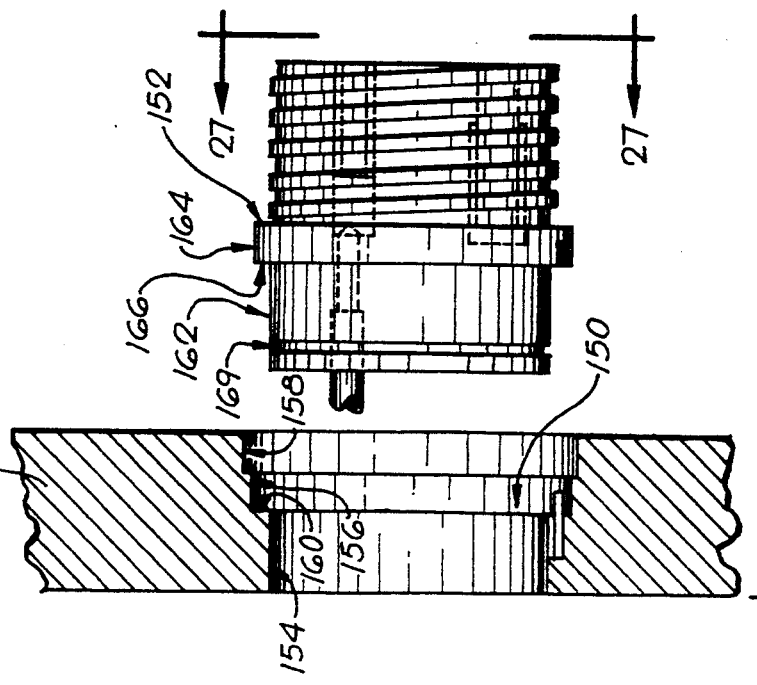
FIG. 26

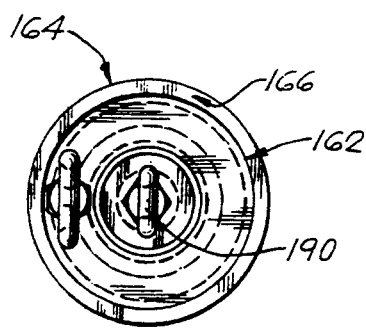
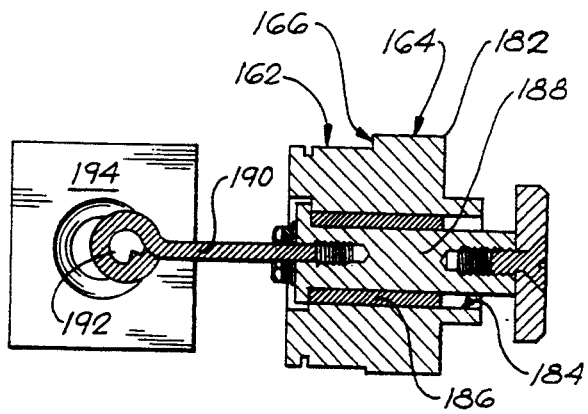
FIG. 33  FIG. 32
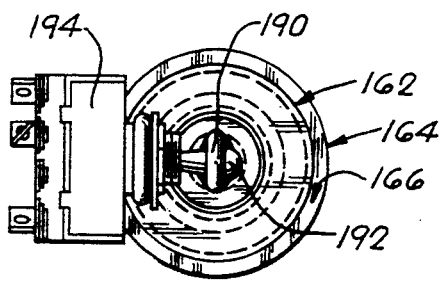
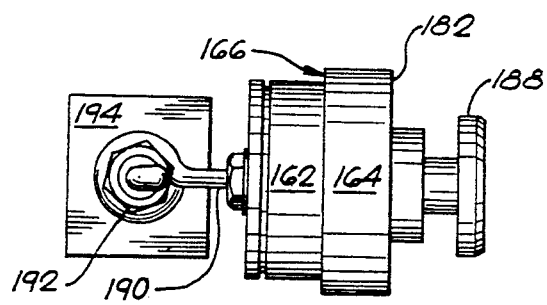
FIG. 31  FIG. 30
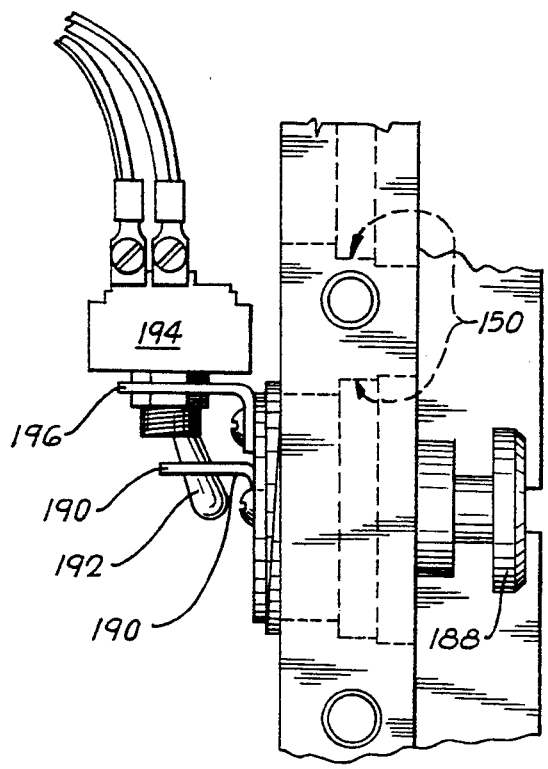
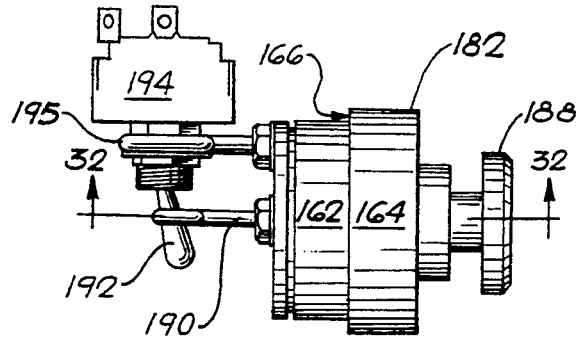
FIG. 28  FIG. 29

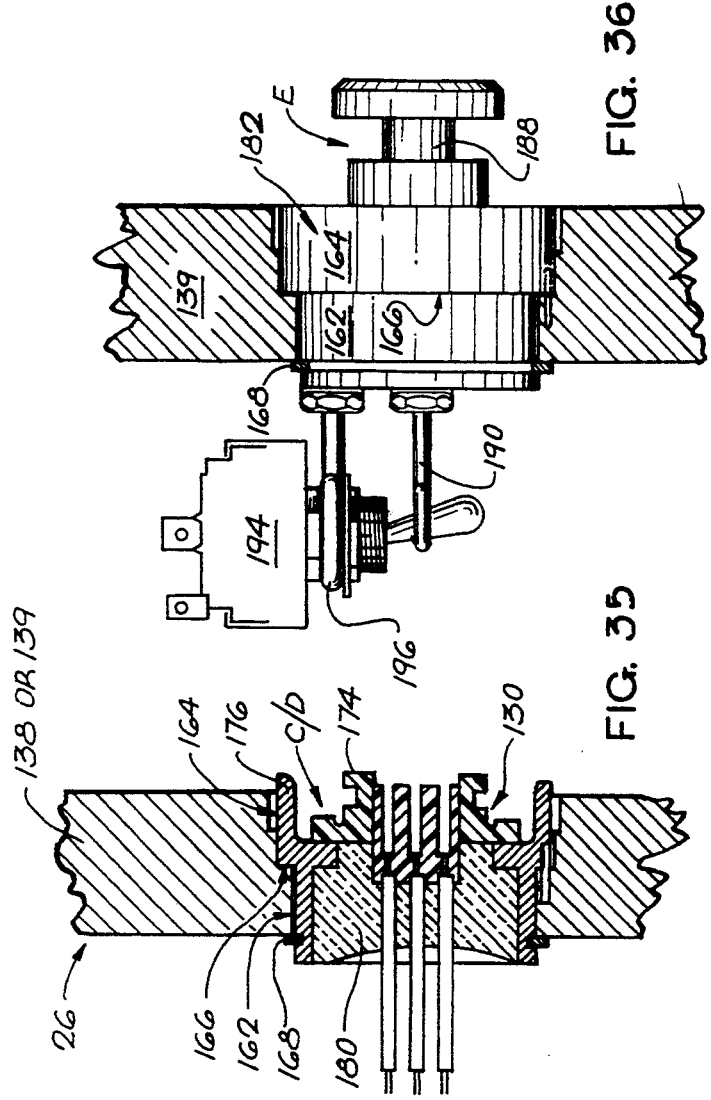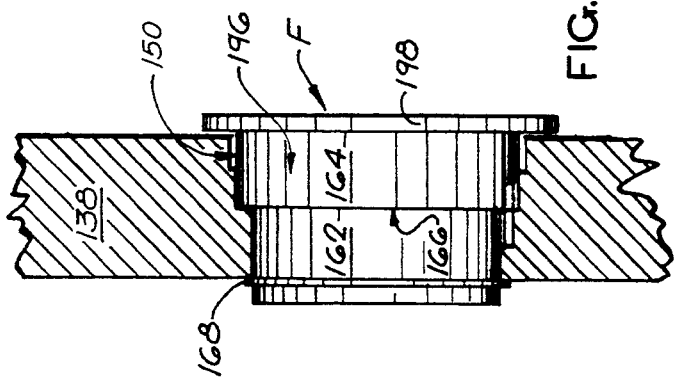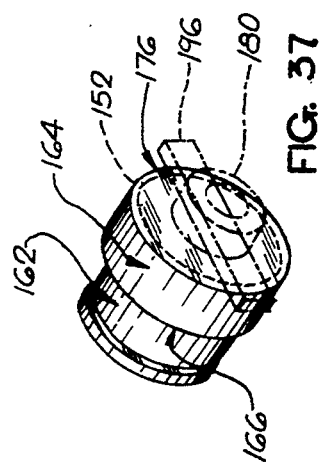

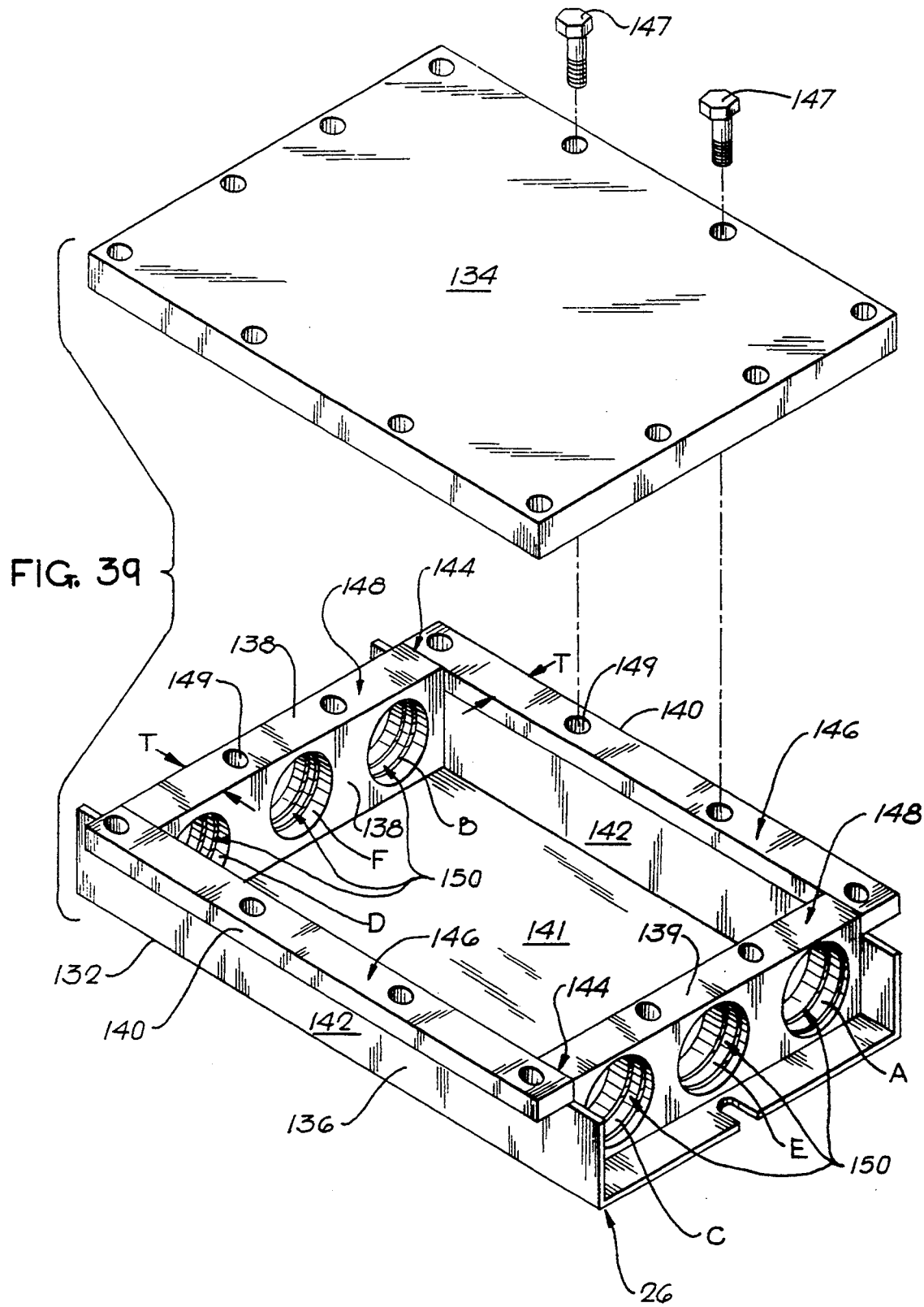

LUMINAIRE FOR HAZARDOUS ATMOSPHERES AND EXPLOSION PROOF ENCLOSURE FOR POWER SUPPLY THEREFOR

BACKGROUND OF THE INVENTION

This invention relates generally to lighting systems for hazardous atmospheres such as present in underground coal mining where explosive concentrations of methane and coal dust are possible hazards that must constantly be guarded against.

U.S. Federal Government regulations require that a coal face and mining machines working in the coal face area of underground coal mines be provided with lighting in order to reduce the risk of injury to miners working in these areas. There are specific minimum levels for both incident and reflected light which must be met in order to comply with the law.

The presence of methane gas and finely divided coal dust in coal mines create serious risks of explosions and fires where electrical equipment is used. All electrical equipment, including lighting systems, used in areas of coal mines which may contain explosive atmospheres must comply with U.S. Federal Government standards which are set out in applicable federal statutes found in 30 C.F.R. 18. These standards are concerned primarily with construction of "explosion proof enclosures", for electrical equipment, and "intrinsically safe circuitry".

Because of their greater efficiency, fluorescent lamps are employed almost exclusively in lighting systems for longwall mining and for mining machines. Many hundreds of fluorescent light tubes will be used at a typical longwall mining face. Each is protected in a heavy enclosure including rugged polycarbonate clear tubing which require special procedures and tools for removing and replacing individual components such as luminaires, bulbs, and control circuits.

Explosion proof enclosures for mine lighting power supplies have typically been "tailor made", with a variety of specially constructed, flame-proofed input and output access ways for high voltage AC conductors, low voltage DC intrinsically safe circuitry, switch actuators, etc. Thus, these previous explosion proof enclosures have often been manufactured a few at a time, on special order, without a standard design.

BRIEF SUMMARY OF THE INVENTION

This invention relates to a mine lighting system especially useful in longwall mining areas and on machinery therefor. It provides specific improvements in service operations on luminaires and in providing standardized power supply enclosures utilizing both explosion proof construction and intrinsically safe circuitry.

An object of the invention is to provide a luminaire in an explosion proof transparent housing, powered by an intrinsically safe supply, which can be removed and replaced without tools.

Another object of the invention is to provide a luminaire which can be disassembled, a bulb replaced, and the luminaire reassembled, quickly, and without tools.

Another object of the present invention is to provide a standard, off-the-shelf explosion proof enclosure for lighting system power supplies, with identical explosion proof openings, which can be manufactured in advance and stock piled for later use for a wide variety of special purpose applications, with adaptors in the various standard openings for different specific uses.

Another object of the invention is to provide such standard explosion proof enclosures with one or more thick metal plate walls in which the standard identical openings are drilled and reamed, each opening having a standard internal circular surface defining one side of a flame-quenching path, and subsequently fitting into said openings receptacles or special-purpose adaptors, all having external circular surfaces which define with the standard internal circular surfaces in the standard openings, the other side of the flame-quenching path.

There may be numerous entries into the enclosure, principally for cable conductors of one kind or another. All of these entries are through the thick metal end walls of the enclosure and the manufacture is greatly facilitated by pre-machining the entry holes prior to welding the end walls into the enclosure. The fact that these walls are thick, means that the flame paths required by the explosion proof design can be obtained by simple boring and reaming operations applied to the thick sections without the need to manufacture and weld on other components such as bulky hubs and bushings. Furthermore, this construction makes it possible to have entries in closer proximity to one another than has heretofore been possible in conventional equipment. However, a most beneficial feature of the present explosion proof design is that the size and shape of all the machined orifices in the thick end walls are identical, even though the function of the mating parts which fit in the holes may be different. Numerous specific examples of such special purpose entries having different functions will be described hereinafter.

BRIEF DESCRIPTION OF THE DRAWINGS

Other objects and advantages will be apparent from the following description taken in connection with the drawings in which:

FIG. 2 is a fragmentary side view of a luminaire assembled on a mounting base plate which, in turn, is secured at a point of use;

FIG. 3 is a side view of the mounting base plate alone;

FIG. 4 is a fragmentary enlarged portion of FIG. 2;

FIG. 5 is a cross section of FIG. 4 taken along line 5—5;

FIG. 6 is a cross section of FIG. 4 taken along line 6—6;

FIG. 7 is a view similar to FIG. 6 showing the luminaire rotated to direct light in a different direction;

FIG. 8 is a cross section of FIG. 4 taken along line 8—8;

FIG. 9 is a fragmentary cross section of FIG. 4 taken along line 9—9;

FIG. 24 is an enlarged fragmentary cross section of FIG. 22 taken along line 24—24 showing a receptacle assembled into a wall of the enclosure;

FIG. 25 is a view similar to FIG. 24 showing an external plug screw-assembled onto the external threads of the receptacle shown in FIG. 24;

FIG. 26 is an exploded disassembled view of the wall portion, receptacle, and external plug shown in FIG. 25;

FIG. 27 is an external end view of the receptacle shown in FIG. 26 taken along line 27—27;

FIG. 28 is a fragmentary enlarged view of FIG. 21 showing an operating plunger journal ed in an adaptors in the enclosure wall and connected to operate a switch carried on the adaptors inside the enclosure;

FIG. 29 is a view similar to FIG. 28, with the enclosure wall removed;

FIG. 30 is a bottom end view of FIG. 29;

FIG. 31 is a left hand end view of FIG. 30;

FIG. 32 is a cross sectional view of FIG. 29 taken along line 32—32;

FIG. 33 is a fragmentary left hand view of FIG. 32 with the switch removed;

FIGS. 34, 35 and 36 are enlarged cross sections taken on lines 34—34 of FIG. 23 and lines 35—35 and 36—36 of FIG. 22 showing on the same page, to the same scale, cross sections of different special purpose adaptors used with identical explosion proof, flame-quenching internal surface configurations in the enclosure wall;

FIG. 37 is a composite perspective view showing the identical external surface configurations employed on the receptacle shown in FIG. 24 and on all the adaptors illustrated in FIGS. 34, 35 and 36;

FIG. 38 is a reduced copy of FIG. 35 showing a broken line outline of an external plug for an intrinsically safe circuit; and FIG. 39 is an exploded perspective view of a standard explosion proof enclosure with standard identical openings in accordance with the present invention.

Like parts are referred to by like reference characters throughout the figures of the drawings.

DETAILED DESCRIPTION OF THE PREFERRED EMBODIMENT(S)

Figure 1:
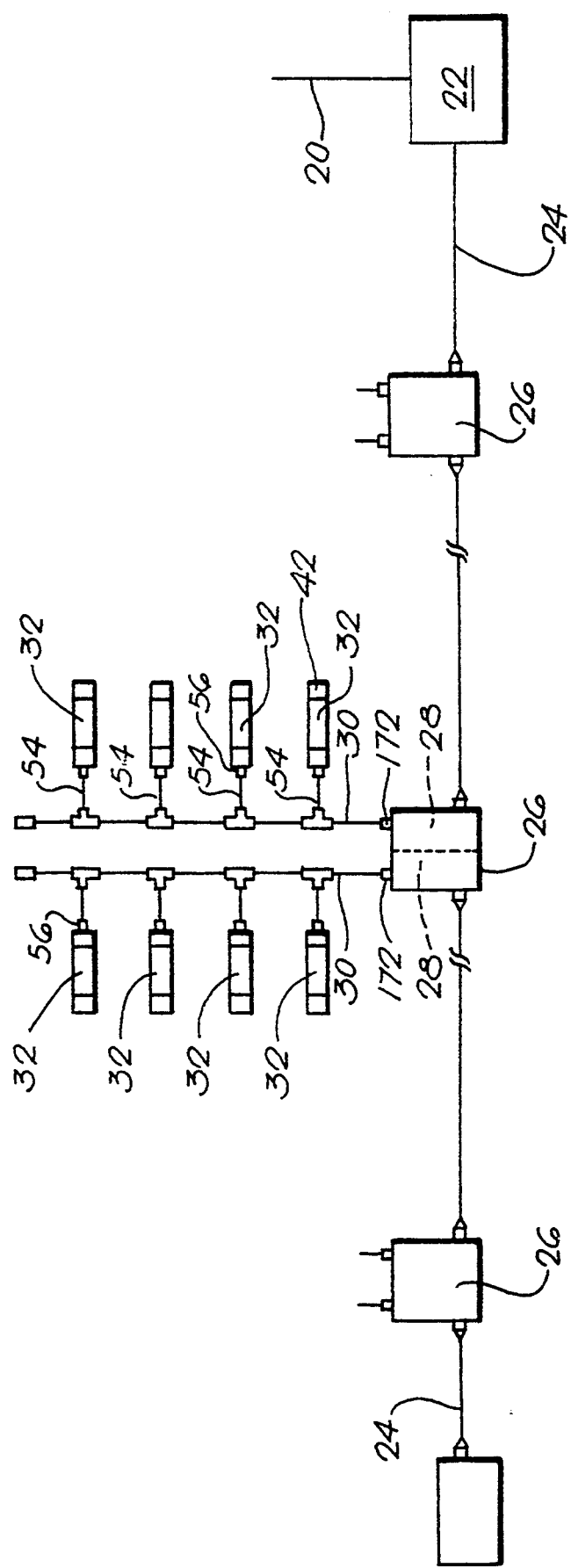
FIG. 1 is a block diagram of an underground coal mining longwall system utilizing the present invention.

Referring now more particularly to the examples of the present invention shown in the drawings, a mine lighting system employing the present invention is illustrated in the block diagram shown in FIG. 1.

An input cable 20 provides input power at 600–4,000 volts AC to a power transformer 22 which directs output power at 120 volts AC into cable 24 passing through a series of explosion proof power supply enclosures 26.

Each of the explosion proof enclosures 26 has a pair of power supply and intrinsically safe barrier units 28 (shown in FIGS. 1 and 21), each directing 12 volt DC output through a conductor 30 to a plurality of fluorescent luminaires 32. This will be an intrinsically safe circuit. For a description of the units 28, reference should be had to the above mentioned co-pending application Ser. No. 07/893/206.

An important part of this invention is the improved luminaires 32 and the power supply enclosures 26. One each of these will now be described.

Each of the luminaires 32 comprises a transparent enclosure tube 33 of clear plastic material such as polycarbonate, threadedly engaged at 36 and 38 respectively with a cylindrical handle end housing 40 at one end of the tube and a cap end housing 42 at the other end of the tube. The housings 40 and 42 are secured against loosening by set screws 31, preferably requiring special tools for removal.

A light carriage 44, best shown in FIGS. 15–18, comprises a unitary subassembly consisting of a rigid elongated reflector member 46 having light bulb holders 48 and 50 at the handle and cap ends respectively. A fluorescent light bulb tube 52 is supported between the holders 48, 50 and is removeable and replaceable with it as a unit.

Figure 10:
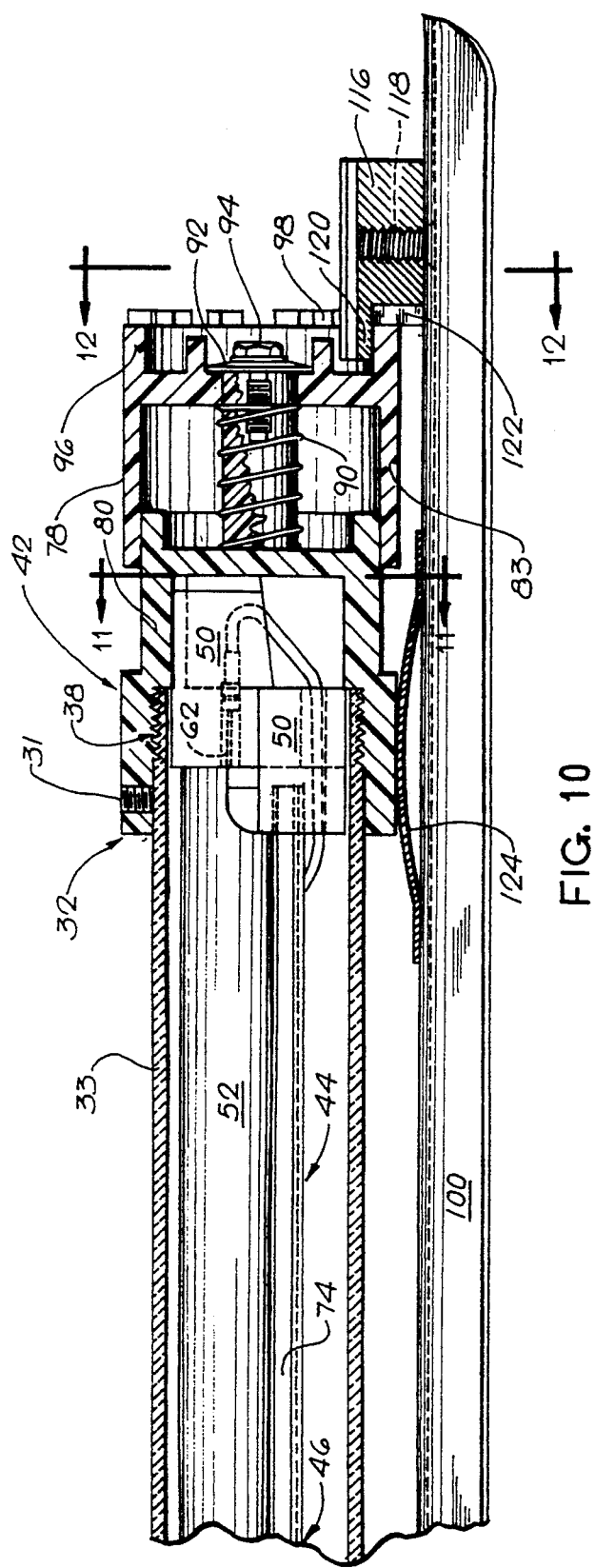
FIG. 10 is a fragmentary enlarged view of FIG. 2.
Figure 19:
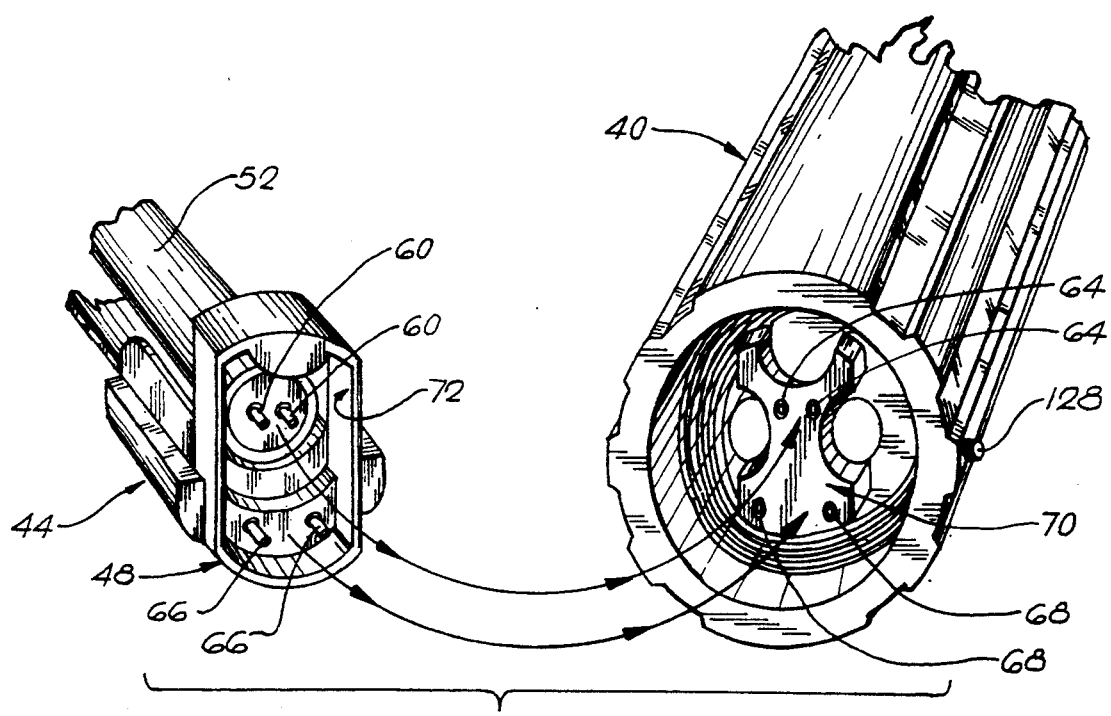
FIG. 19 is a fragmentary perspective view illustrating complementary, intermitting formations at the ends of the light carriage and handle housing.

As shown in FIGS. 1 and 4, conductors 30 are connected through branch conductors 54 and screw plugs 56 to luminaires 32 via a converter 58 which is not part of the present invention and will not be described in detail. Briefly however it converts 12 volt DC input from conductor 54 to high frequency alternating current applied to the light bulb pin terminals 60, 60 and 62, 62 (FIGS. 19 and 10).

Complementary plug and socket formations 70 and 72, respectively, on housing 40 (FIG. 19) enable the light carriage to be rotated to align pin contacts 60, 66 on the light carriage with socket contacts 64, 68 respectively before the light carriage can be pushed inwardly to engage them.

The light bulb holders 48, 50 are formed to support the bulb 52 as far off center in the enclosure tube 33 as possible. This is best shown in FIGS. 4, 6, 7 and This provides room for a maximum width reflector 46 in the center of the relatively narrow enclosure tube 33, and enables it to be substantially as wide as the interior diameter of the enclosure tube (FIGS. 6 and 7). Further, by providing the combination of such a wide reflector with a relatively narrow light bulb tube, it is possible for the reflector to train light past the light bulb tube and direct it in a desired direction as shown in FIGS. 6 and 7.

The reflector 46 has a central mirror portion 74 close to the backside of the light bulb 52, in the shape of an inverted "V" to project light tangentially outwardly from the backside of the light bulb as shown by the arrows in FIGS. 6 and 7. Further, it has flat diagonal mirror surfaces 76, 76 along each edge to receive light from the inverted "V" and reflect it past both sides of the relatively narrow light bulb 52, as also shown by arrows in FIGS. 6 and 7.

Figure 12:
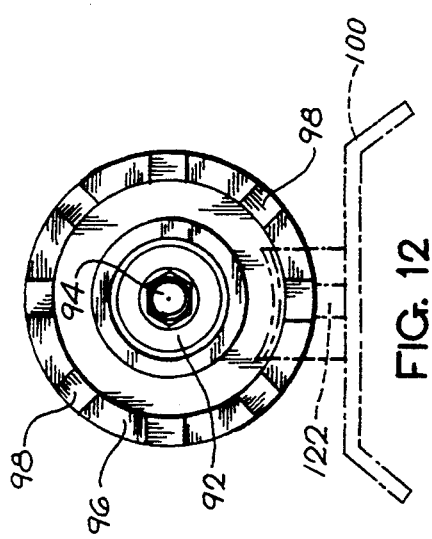
FIG. 12 is a fragmentary cross section of FIG. 10 taken along line 12—12.
Figure 11:
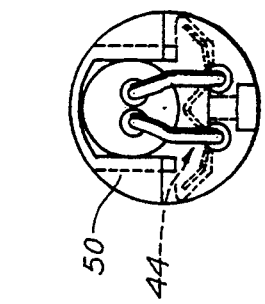
FIG. 11 is a fragmentary cross section of FIG. 10 taken along line 11—11.
Figure 13:
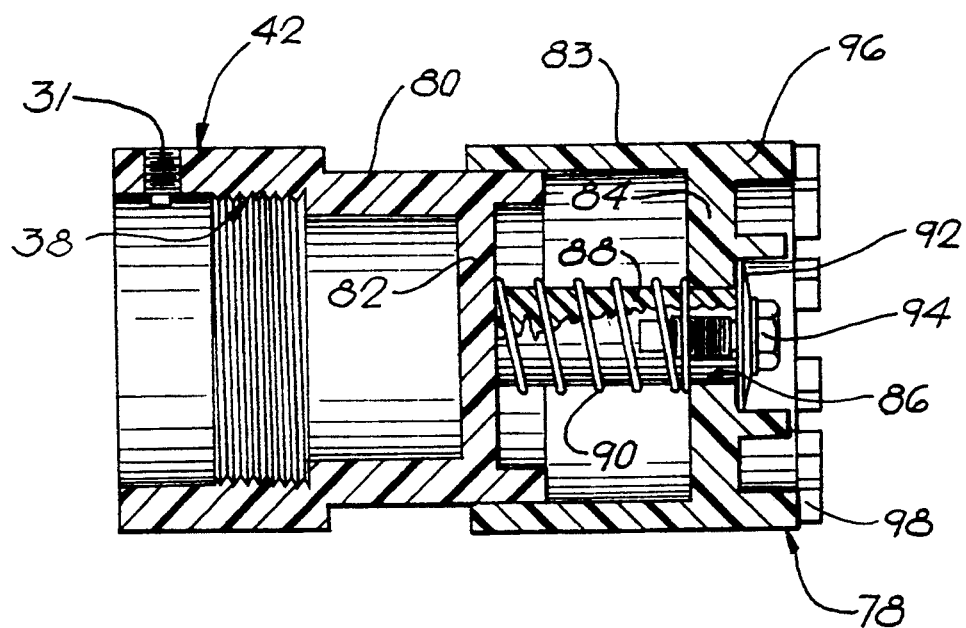
FIG. 13 is a fragmentary view of FIG. 10 showing the cap end housing by itself.

As best shown in FIG. 13, the cap end housing 42 has a cylindrical end section 78 which is telescopically slidably mounted on the end cap housing 42. More particularly, the cap end housing 42 has a reduced diameter section 80 closed by an end wall 82. The end section 78 comprises a cylindrical skirt 83 which is telescopically, slidably engaged with the outside of the housing 42, and an outer transverse wall 84 having a central opening 86 slidably journaled on a central post 88 extending axially from the end cap wall 82. A coil spring 90 is compressibly interposed between walls 82 and 84 and urges the end section 78 outwardly against a stop washer 92 which is held by a bolt 94 threadedly engaged with the post 88. The outer end of section 78 has a castellated, cylindrical rim 96 having circumferentially spaced notches 98 (FIGS. 12 and 13). Thus the end cap housing 42 has an outer, cylindrical section 78 with a castellated rim 96 which is telescopically moveable, and rotatable, to engage a mounting bracket on the base as will now be described.

An important feature of the invention is that the luminaire is readily mountable on, and detachable from, an elongated base plate 100, without tools. The base may be permanently mounted to a flat surface member 102, by bolts 104, or by means of magnets (not shown) as shown in FIG. 2.

The handle end housing 40 has a cylindrical outer surface with a series of longitudinal ribs 106 to facilitate handling. It has a partially castellated cylindrical rim 108 with notches 110, 112, and 114 which are 45° apart to determine the rotated orientation of the luminaire and the direction of light projected from it, examples being shown in FIGS. 6 and 7.

A pair of upstanding mounting brackets 116 are secured at opposite ends of the base plate 100, as by bolts 118 (FIG. 3). Referring to FIGS. 4, 6, 7, 8 and 20, each bracket has a horizontal tongue 120 curved to conform to the circular castellated rims 96 and 108. Thus the tongues 120 and rims 96 and 108 comprise interengaging latch means securing the luminaire to the base mounting plate 100.

The rotated position of the luminaire and hence the direction that light is projected from the reflector in the light carriage is determined by detents 122 which, at the handle end housing, optionally engages notches 110, 112 or 114 to orient the reflector member at right angles to the base as shown in FIG. 6, or at 45° as shown in FIG. 7.

A pair of leaf springs 124 are mounted on the mounting base plate 100. When the luminaire is assembled on the base plate as shown in FIGS. 4 and 10, these leaf springs flatten out and press the end housings 40 and 42 upwardly into secure engagement with the bracket tongues 120.

Figure 14:
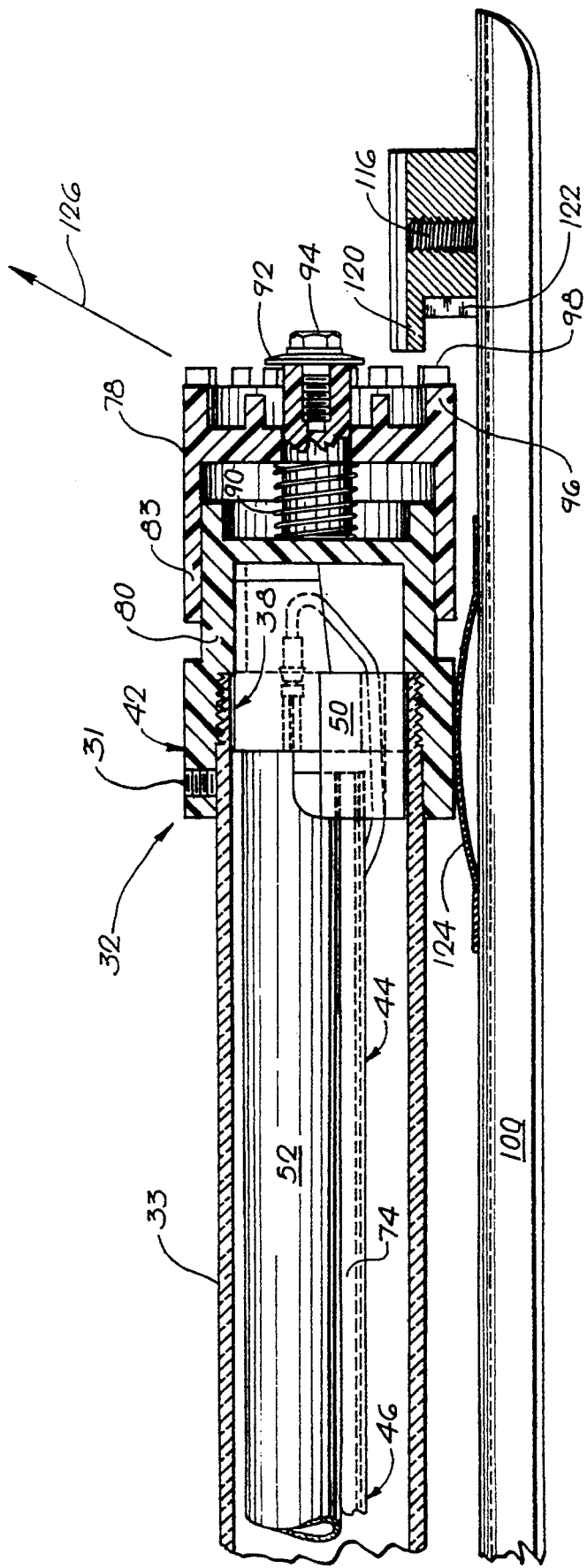
FIG. 14 is a view similar to FIG. 10 showing the cap end housing telescopically compressed to initiate release of the luminaire from the mounting base plate.
Figure 17:
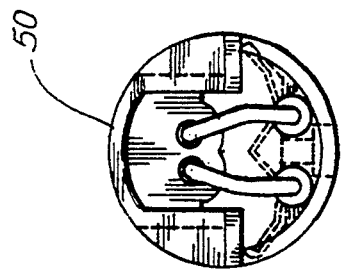
FIG. 17 is a right hand end view of FIG. 15.
Figure 18:
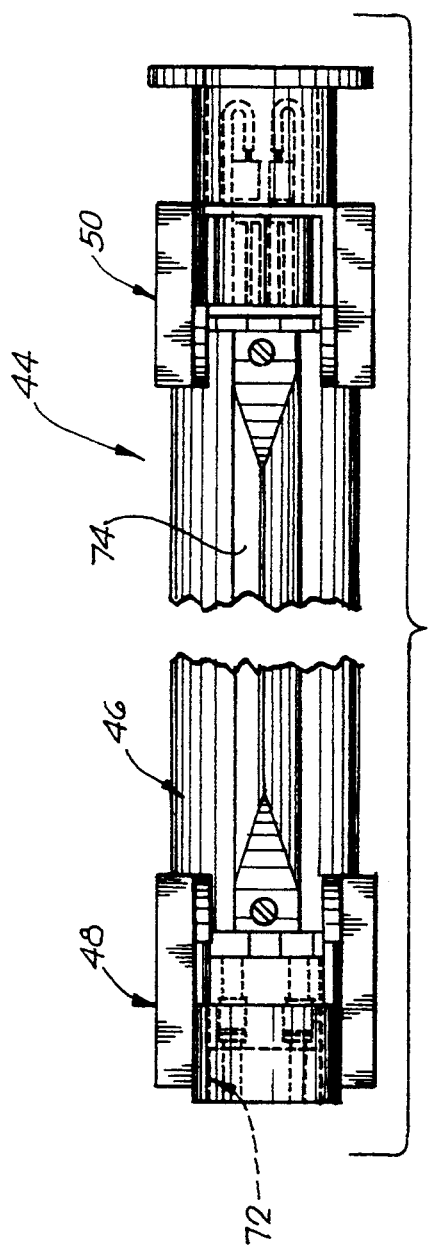
FIG. 18 is a top view of FIG. 15.
Figure 15:
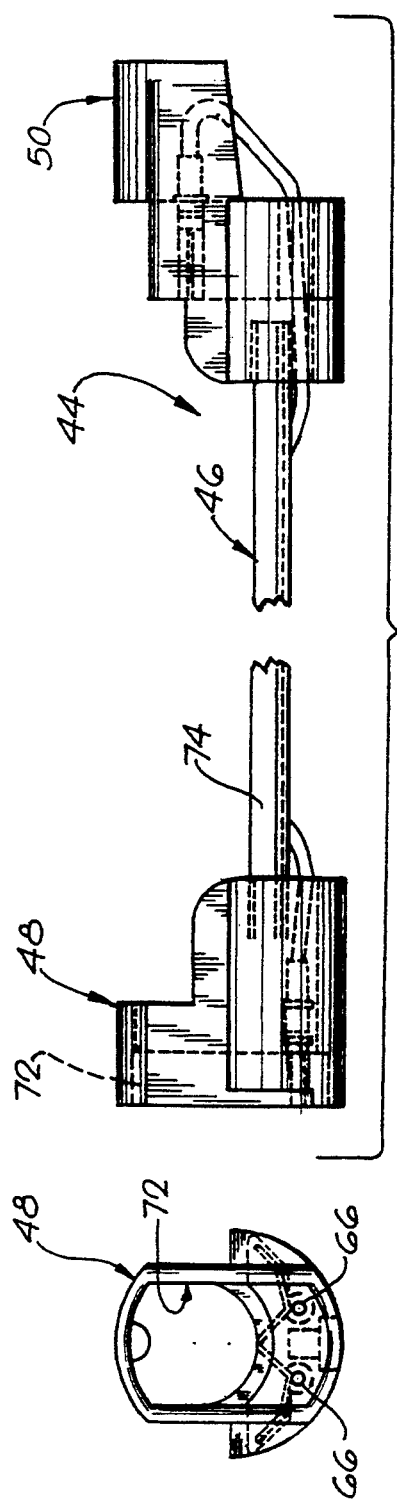
FIG. 15 is a fragmentary side view of a unitary light carriage.
Figure 16:
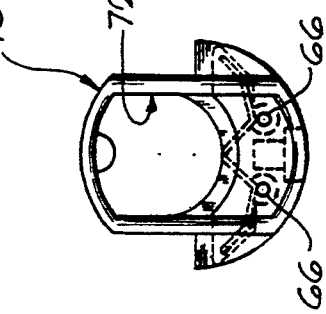
FIG. 16 is a left hand end view of FIG. 15.
Figure 20:
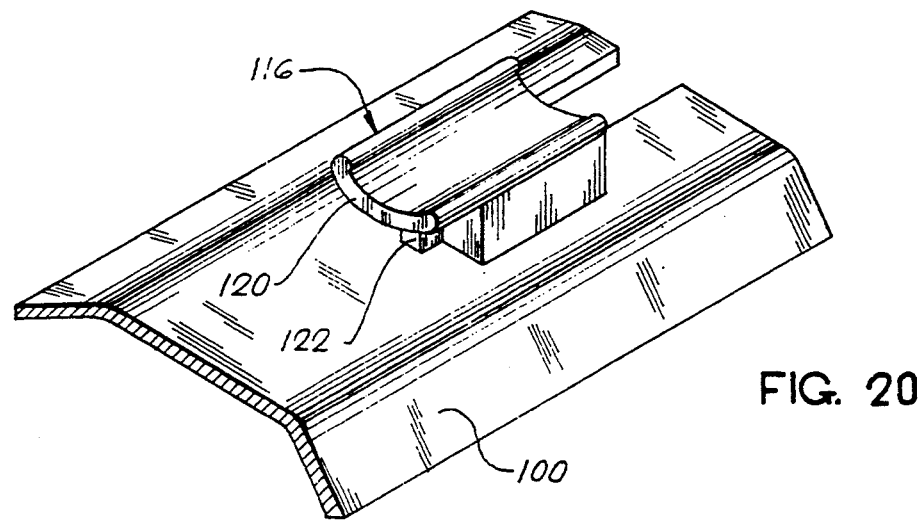
FIG. 20 is a fragmentary enlarged perspective view of a portion of the mounting base plate showing details of one of the mounting brackets.

To disassemble the luminaire from the base plate 100, it is necessary only to push the cap end housing section 78 axially inwardly as shown in FIG. 14 to compress spring 90 and release the rim 96 from the mounting bracket tongue 120, and to release the detent 122 from one of the notches 98. This enables the operator to lift the cap end housing portion of the luminaire in the direction of the arrow 126 (FIG. 14). Movement of the luminaire in that direction automatically disengages the rim 108 from the tongue 120, at the handle end, and disengages notch 112 (or 110 or 114) from the detent 122, freeing the luminaire from the base. The plug coupling 56 may be disengaged from the luminaire before or after the luminaire is disengaged from the base. This can be done without hazard because plug coupling 56 is part of an intrinsically safe circuit.

To replace the fluorescent bulb 52, the cap end housing 42 is removed (after releasing the set screw 31, if necessary) simply by manually unscrewing it from enclosure tube 33. This exposes part of the light bulb holder 50 at the end of the light carriage 44. By grasping the light bulb holder 50, the entire light carriage and bulb can be pulled out as a unit.

After replacing the bulb in the light carriage, the light carriage with bulb can be reassembled as a unit in the luminaire simply by inserting it through the open end of the enclosure tube 33 and rotatably orienting it until the socket formation 72 on the light carriage is aligned with the plug formation 70 in the handle end housing 40 as shown in FIG. 19. The pin contacts 60, 66 can then be seated in the socket contacts 64, 68 by simply pushing the light carriage inwardly.

After replacing the cap end housing 42, the luminaire can be mounted on the base 100 by pressing the cap end housing section 78 inwardly, aligning engaging the detents 122 with one of the notches 98 and an appropriate one of the handle end notches 110, 112 or 114, whereupon the lamp is ready for a further period of use.

Another important feature of the invention is the explosion proof power supply enclosure 26 shown in a number of locations in the block diagram of FIG. 1. In that diagram, each enclosure 26 contains principally power supply and intrinsically safe barrier units, generally designated 28, details of which form no part of the present invention but are described in the co-pending application first identified above. Typically, there are two such units 28 in each enclosure 26 as shown.

In general each unit 28 converts 120 volt AC input from conductor 24 to a 12 volt DC output in the respective cable 30 providing an intrinsically safe power supply to each of the cables 54 for the luminaires 32 as described above.

In the example shown, each enclosure 26 has a pair of outlets 130, 130 connected to the 12 volt intrinsically safe circuit cables 30, 30. (For the sake of clarity in the block diagram, only one of the enclosures 26 is shown in FIG. 1 with the 12 volt DC outgoing circuits connected. In practice, similar layouts would be associated with each of the enclosures 26. As best shown in FIG. 39, the body 132 of the enclosure 26 is fabricated from mild steel using conventional forming and welding methods, and the cover 134 is made from aluminum alloy plate.

The enclosure body 132 comprises a U-shaped plate 36, a pair of relatively thick end walls 138, 139, and a pair of rectangular upper rim bars 140, 140.

The plate 136 is bent to form three sides of the enclosure, namely the bottom 141 and two side walls 142, 142. The end walls 138 and 139 are relatively thick, at least 1", to provide proper lengths for flame-quenching paths in the explosion proof connections as will be described. The rim bars 140 are welded to the tops of the side walls 142 and to corresponding ends of the end walls 138 at areas marked 144 in FIGS. 21 and 39. The top surfaces 146 and 148 of the bars 140 and end walls 138 and 139, respectively, are horizontally co-planar and have substantially the same horizontal thickness "T" (FIG. 39). In the example shown, the horizontal thickness "T" would be at least 1". The aluminum alloy cover 134 is held on the top of the body by bolts 147 extending through openings in the cover into screw-threaded bores 149 in the body top surfaces 146 and 148.

There are six identical openings 150 in the enclosure 26. These are located at the positions designated A, B, C, D, E and F in the two thick end plates 138 and 139. Since all these entry openings 150 are in the thick end walls, manufacture is greatly facilitated by pre-machining all the entry openings prior to manufacturing the enclosure 26. The fact that these walls are thick means that the flame paths required to produce effective explosion proof construction can be obtained by simple boring and facing operations on the thick sections before other components have been manufactured and welded to them. Furthermore, this design makes it possible to have entry openings in closer proximity to each other than would otherwise be the case because the major dimensions of the flame paths are normal to the surface of the wall and not lateral as would usually be the case. However the novel and most beneficial feature of the new design is that the size and shape of all the machined orifices in the end walls of the enclosure are identical, even though the function of the mating parts which fit into the holes is different.

For example, in the lighting system shown in the block diagram of FIG. 1 the standard, identical entry openings 150 at locations A and B provide input and output connections for a power cable 24 carrying a 120 volt three phase circuit rated at 50 amperes. A suitable explosion proof receptacle 152 is shown for this purpose and fits directly into any of the standard openings 150 with the required explosion proof tolerances and with effective length dimensions for flame-quenching paths (see FIG. 21).

As best shown in FIG. 26, each of these identical standard explosion proof openings 150 comprise a bore 154, a counterbore 156, and a further external counterbore 158. To provide effective explosion proof construction, the combined flame-quenching path measured axially along the bore 154 and counterbore 156, and along the radial width of the shoulder 160 between the bore and counterbore must be at least ¾".

The receptacle 152 has an external cylindrical surface 162 which fits within the bore 154, and a larger diameter cylindrical surface 164 which fits within the counterbore 156. A shoulder 166 engages shoulder 160 in the assembly shown in FIG. 25. The receptacle 152 is held in place by a retaining ring 168 in a groove 169. As shown in FIG. 25, the second counterbore provides clearance for the coupling ring 170 of plug 172. For an effective flame-quenching path, the radial clearance between surfaces 154/162 and 156/164 must be no greater than 0.004".

Thus, the receptacle 152 has an external circular surface (162, 164, 166) which is a fitted counterpart of an internal surface (154, 156, 160) in the standard opening 150.

Likewise, the standard identical openings 150 at locations C and D support output receptacles 174 (FIG. 35) for 12 volt DC 5 ampere intrinsically safe circuits. For this purpose, an adaptor 176 is provided having external surfaces which are exact counterparts of external surfaces 162, 164 and 166 on the receptacle 152. These are shown in FIGS. 35 and 37. The adaptor 176 provides the required explosion proof tolerances between its external surface and the internal surface of the standard opening 150. However, the fit between the intrinsically safe receptacle 174 and the mating plug 178 (FIG. 38) is not required to be explosion proof in this case since it is serving an intrinsically safe circuit. Hence this receptacle can be of a simpler, less expensive, design. In order to maintain the integrity of the explosion proof enclosure, the receptacle 174 is sealed into the adaptor 176 by means of a hard setting potting material 180, this being an accepted explosion proof assembly technique.

For certain applications, there is a requirement that lighting circuits be provided with switches and conventionally the walls or covers of explosion proof enclosures have been fitted with long bushings through which sliding or rotating switch operating shafts have been located. In the present invention, as shown in FIGS. 29-36, an adaptor 182 is provided with exactly the same external surface configuration as described for adaptor 176. This includes cylindrical surfaces 162 and 164 with shoulder 166 therebetween. This is held in standard opening 150 at position E by retaining ring 168 as are the other structures described above.

The adaptor 182 has a central bore 184, and a bushing 186 journaling a switch actuator plunger 188 for in and out movement through the adaptor. Inside the enclosure a plunger extension rod 190 engages a toggle operator 192 for an electrical switch 194. The plunger 188 may reciprocate or rotate, as required for the specific switch inside the enclosure. An advantage of this construction is that the switch assembly itself can be mounted on the inside surface of the adapter by 182 a bracket 195, as shown, so the switch requires no additional support inside the enclosure.

If there is no present use for one of the standard openings 150, it may be retained for future use by means of a plug employing the principles of the present invention.

Figure 21:
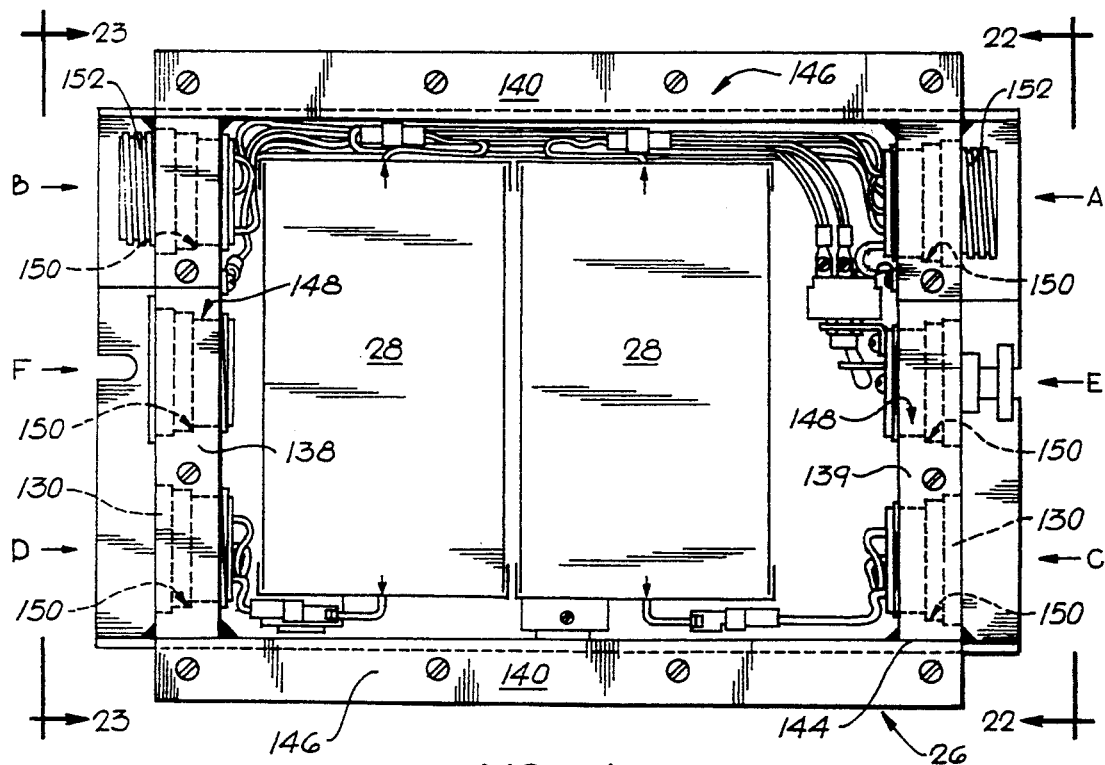
FIG. 21 is a top view of an explosion proof and intrinsically safe enclosure illustrating one form of this invention.
Figure 22:
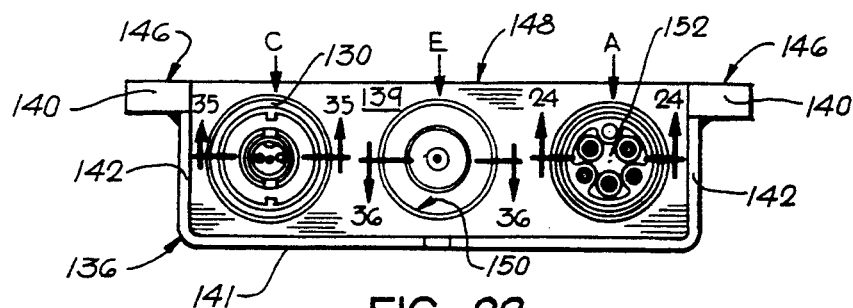
FIG. 22 is a right hand end view of FIG. 21 taken in the direction of arrows 22—22.
Figure 23:
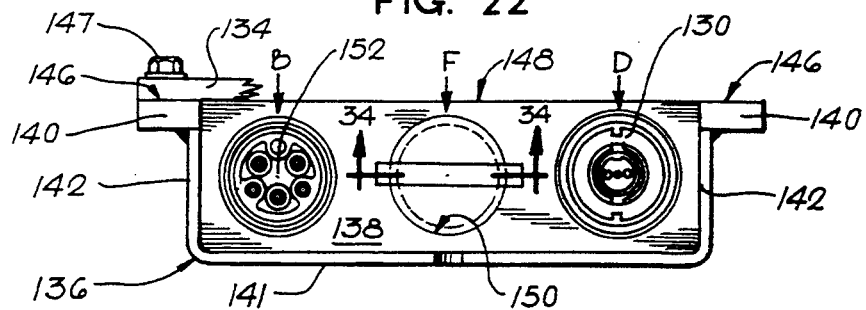
FIG. 23 is a left hand end view of FIG. 21 taken in the direction of arrows 23—23.

Such a plug is designated 196 in FIG. 34 and is shown at position F in FIGS. 21 and 23. It has the same identical external surfaces 162, 164, and 166 as described above to provide an explosion proof juncture with the standard orifice 150. A transverse handle (FIG. 34) is shown to facilitate moving it in and out of the orifice 150.

FIG. 37 is a composite drawing showing how the identical external surfaces 162, 164 and 166 are provided on the outside of the receptacle 152 and all of the adaptors 176, 182 and plug 196.

The embodiments described and shown to illustrate the present invention have been necessarily specific for purposes of illustration. Alterations, extensions and modifications would be apparent to those skilled in the art. The aim of the appended claims therefor is to cover all variations included within the spirit and scope of the invention.

The embodiments of the invention in which an exclusive property or privilege is claimed are defined as follows:

1. A luminaire which is readily removable and replaceable, and readily assembleable and disassembleable, comprising:
   a transparent enclosure tube, housing means comprising a pair of end housings connected to opposite ends of the tube, a light carriage within the tube, and a base;
   said light carriage comprising a unitary subassembly consisting of a rigid, elongated reflector having light bulb holders secured at its opposite ends;
   a tubular light bulb removably supported between said holders and assembleable as a unit with the light carriage;
   means for energizing said light bulb comprising an electrical power input coupling means on said housing means, and electrical contact connections between the housing means and the light bulb holders and between the bulb holders and light bulb;
   complementary plug and socket formations connected to and between the light carriage and housing means requiring said light carriage to be rotated to align said electrical contact connections between the housing means and the bulb holders moving the light carriage to close said contact connections;
   first interengageable means being effective when engaged to secure one of said housings to the base;

second interengageable means being effective when engaged to secure the other of said housings to the base;

said first interengageable means comprising a pair of latch elements carried respectively on said one housing and on the base, one of said latch elements being movable to and from a locked position engaged with the other latch element, spring biasing means associated with said one housing urging the movable latch element toward said locked position to secure said one housing to the base while the other housing is secured to the base by the second interengageable means;

means for manually moving the movable latch element from said locked position against the bias of the spring biasing means to disengage the first interengageable means to release said one housing and enable movement of said one housing relative to the base;

said movement of said one housing relative to the base serving to automatically disengage the second interengageable means to release said other housing from the base.

2. A luminaire according to claim 1 in which said movable latch element is a telescopical section of said one housing and said other latch element is secured to the base, and said telescopical section is manually movable against the bias of said spring biasing means to disengage said telescopical section from said other latch element to release said one housing from the base.

3. A luminaire according to claim 1 in which said one housing is a cylindrical housing coaxial with said enclosure tube, and said movable latch element is an outer cylindrical section of said cylindrical housing which is telescopically carried on said cylindrical housing, said outer cylindrical section having an external circumferential rim engaged with the other latch element on the base, and said outer cylindrical section is manually movable axially against the bias of the spring biasing means to release said external circumferential rim from the other latch element.

4. A luminaire according to claim 1 in which the reflector extends parallel to the tubular light bulb, closely adjacent thereto, and is substantially wider than the light bulb and thereby effective to reflect light transversely past the tubular light bulb through the transparent enclosure tube.

5. A luminaire according to claim 1 in which a diameter of the tubular light bulb is substantially smaller than an inside diameter of the transparent enclosure tube, the tubular light bulb is positioned substantially off-center within the transparent enclosure tube, the light bulb being closest to the inside of the enclosure tube along a radius representative of the preferred direction of reflected light emission from the reflector; and the reflector is substantially wider than the diameter of the tubular light bulb, and thereby effective to reflect light transversely past the light bulb and through the transparent enclosure tube.

6. A luminaire according to claim 5 in which the reflector has a central mirror portion closest to a side of the light bulb which is farthest from the transparent enclosure tube, the said mirror portion having the shape of an inverted V, an apex of which is in close proximity to the light bulb whereby to reflect light bilaterally.

7. A luminaire according to claim 6 in which the reflector has flat, diagonal mirror surfaces along each elongated lateral margin of the reflector effective to receive light from the inverted "V" and reflect it past lateral sides of the light bulb.

8. A luminaire according to claim 1 in which said complementary plug and socket formations are provided between one of said end housings and a corresponding light bulb holder, and said electrical contact connections between the housing means and the light bulb holds comprises first and second sets of pin and socket contacts between the housing means and the respective ends of the tubular light bulb.

9. An intrinsically safe luminaire which is readily assembleable and disassembleable, comprising:

a transparent enclosure tube, a cylindrical handle housing connected to one end of the tube, a cylindrical cap housing removably secured to the opposite end of the tube, and a light carriage within the tube;

said light carriage comprising a unitary subassembly consisting of a rigid elongated reflector comprising plural angularly disposed light reflective surfaces extending lengthwise thereof to reflect light past the lateral sides of a tubular light bulb and having light bulb holders secured to its opposite ends;

said tubular light bulb supported by and between said holders and being removable and assembleable as a unit with the light carriage;

said handle housing having electrical power input means connectable to an intrinsically safe D.C. electrical power source, and electrical means internally thereof for converting D.C. power from said source to AC power for energizing said light bulb;

electrical contact means interconnecting said electrical means in the handle housing and one of said light bulb holders to energize said light bulb; and complementary plug and socket formations connected to and between the handle housing and said one light bulb holder requiring said light carriage to be moved toward the handle housing to close said electrical contact means only after the light carriage has been rotated to align said electrical contact means;

whereby the light carriage and light bulb can be removed and replaced as a unit through said opposite end of the enclosure tube after the cap housing has been removed.

10. A luminaire according to claim 9 in which the electrical contact means between said electrical means in the handle housing and one of said light bulb holders is a set of pin and socket contacts.

11. A luminaire which is readily removable and replaceable, and readily assembleable and disassembleable, comprising:

a transparent enclosure tube, a pair of housings mounted over opposite ends of the tube, a light carriage supported in said housings and carrying a tubular light bulb within said enclosure tube, and an elongated mounting base plate located externally parallel to said enclosure tube;

means for connecting said light bulb to a source of electrical power through one of said housings;

first and second interengageable means being effective to secure said housings respectively to the mounting base plate;

each of said interengageable means comprising a pair of engaged latch elements carried respectively on the mounting base plate and on one of said housings to secure said luminaire positively to the mounting base plate;

one latch element in one pair associated with one of said housings being movable to and from a locked position whereat it engages the other latch element of that pair, spring biasing means associated with said one housing urging the movable latch element toward said locked position to secure said one housing to the mounting base plate while the other housing is secured to the mounting base plate by engagement of the other pair of latch elements; and means for manually moving the movable latch element from said locked position against the bias of the spring biasing means to release said one housing and enable movement thereof relative to the mounting base plate;

said movement of said one housing relative to the base plate serving to automatically disengage the other housing from the mounting base plate.

12. A luminaire according to claim 11 in which the movable latch element is a telescopical section of one of said housings and said other latch element is secured to the mounting base plate, and said telescopical section is manually movable against the bias of said spring biasing means to disengage said telescopical section from said other latch element to release said one housing from the mounting base plate.

13. A luminaire according to claim 11 in which said one housing is a cylindrical housing coaxial with said enclosure tube, and said movable latch element is an outer cylindrical section of said cylindrical housing which is telescopically carried on said cylindrical housing, said outer cylindrical section having an external circumferential rim engaged with a corresponding latch element on the mounting base plate, and said outer cylindrical section is manually movable axially against the bias of the spring biasing means to release said external circumferential rim from the corresponding latch element on the mounting base plate.

14. A luminaire which is readily removable and replaceable, and readily assembleable and disassembleable, comprising:

a transparent elongated enclosure tube having a central longitudinal axis, a pair of cylindrical end housings mounted over opposite ends of the tube, an elongated light carriage within the tube supported at its opposite ends by said housings, and an elongated mounting base plate extending externally parallel to the enclosure tube;

said light carriage comprising a tubular light bulb and an elongated reflector extending parallel to the light bulb;

means for connecting said light bulb to a source of electrical power through one of said end housings;

each of said cylindrical end housings having an external cylindrical rim;

a pair of brackets secured to the mounting base plate at opposite ends of said cylindrical end housings, each of said brackets having a latch element extending toward a corresponding one of said end housings and engageable with an inside surface of a respective one of said cylindrical rims to secure an associated one of said housings to said mounting base plate;

spring means associated with said base plate acting between said housings and said mounting base plate to urge them apart and take up clearance therebetween;

said luminaire being rotatable about said axis of said enclosure tube while secured to the mounting base plate by the brackets and spring means;

whereby the cylindrical end housing is adjustable about said axis to rotate the light bulb and reflector to direct light from the light bulb and reflector at a predetermined angle relative to said mounting base plate.

15. A luminaire according to claim 14 in which the cylindrical rim on at least one of said housings is castellated, with a plurality of circumferentially spaced notches selectively engageable with a detent on the corresponding bracket to hold the light bulb and reflector at a selected orientation to direct light in a predetermined direction relative to the mounting base plate.

16. A luminaire according to claim 15 in which the external cylindrical rim of another one of the cylindrical end housings is telescopically slidable along the axis of the enclosure tube, has a spring urging the rim outwardly against a corresponding bracket, and is manually movable against the spring to disengage the rim from the bracket and thereby release a corresponding housing from the mounting base plate.

* * * * *